United States Patent
Shoda et al.

(10) Patent No.: US 8,217,538 B2
(45) Date of Patent: Jul. 10, 2012

(54) LINEAR MOTOR HAVING A SLIDABLE ELEMENT

(75) Inventors: Kazuo Shoda, Tokyo (JP); Toshiro Tojo, Tokyo (JP); Yuki Nomura, Tokyo (JP); Akihiro Unno, Tokyo (JP)

(73) Assignee: THK Co., Ltd., Tokyo (JP)

( * ) Notice: Subject to any disclaimer, the term of this patent is extended or adjusted under 35 U.S.C. 154(b) by 297 days.

(21) Appl. No.: 12/647,627

(22) Filed: Dec. 28, 2009

(65) Prior Publication Data

US 2010/0164306 A1 Jul. 1, 2010

(30) Foreign Application Priority Data

Dec. 25, 2008 (JP) ................................. 2008-330958

(51) Int. Cl.
*H02K 41/02* (2006.01)
*H02K 41/03* (2006.01)

(52) U.S. Cl. ............... 310/12.31; 310/12.27; 310/12.01; 310/12.24; 310/12.05; 310/12.04

(58) Field of Classification Search .... 310/12.01–12.33; H02K 41/03
See application file for complete search history.

(56) References Cited

U.S. PATENT DOCUMENTS

| 3,641,939 | A | * | 2/1972 | Remy | 104/293 |
| 5,696,411 | A | * | 12/1997 | Takei | 310/12.21 |
| 5,825,104 | A | * | 10/1998 | Kondo et al. | 310/12.27 |
| 6,573,623 | B2 | * | 6/2003 | Tsuboi et al. | 310/12.19 |
| 6,847,132 | B2 | * | 1/2005 | Ukaji | 310/12.24 |
| 2004/0178684 | A1 | * | 9/2004 | Joong et al. | 310/12 |
| 2005/0194843 | A1 | * | 9/2005 | Korenaga | 310/12 |
| 2005/0248217 | A1 | * | 11/2005 | Cheung et al. | 310/12 |
| 2005/0285451 | A1 | * | 12/2005 | Kubo et al. | 310/12 |
| 2006/0091736 | A1 | * | 5/2006 | Kim et al. | 310/12 |
| 2006/0097584 | A1 | * | 5/2006 | Morel | 310/12 |
| 2006/0125326 | A1 | * | 6/2006 | Baccini | 310/12 |
| 2007/0040453 | A1 | * | 2/2007 | Aoki et al. | 310/12 |
| 2007/0075592 | A1 | * | 4/2007 | Ohno | 310/12 |

FOREIGN PATENT DOCUMENTS

| JP | 58-186788 | 12/1983 |
| JP | 09-261943 | 10/1997 |

* cited by examiner

*Primary Examiner* — Quyen Leung
*Assistant Examiner* — Terrance Kenerly
(74) *Attorney, Agent, or Firm* — Young & Thompson (57) ABSTRACT

A linear motor is provided with a stator, a slider disposed to be movable relatively with respect to the stator with a gap, and a non-magnetic plate mounted to either one of the stator and the slider so as to define the gap between the stator and the slider.

14 Claims, 13 Drawing Sheets

LINEAR MOTOR HAVING A SLIDABLE ELEMENT

BACKGROUND OF THE INVENTION

1. Field of the Invention

The present invention relates to a linear motor provided with a stator and a slider relatively movable with respect to the stator, and more particularly, to a linear motor having a structure capable of easily controlling a gap between the stator and the slider.

2. Related Art

A linear motor has been widely used for a motion guide mechanism or apparatus such as machine tool, industrial robot or the like for moving an object to be moved to a predetermined position with high performance. Such linear motor is generally composed of a stationary member (called hereinlater "stator") and a movable member (called hereinlater "slider") in which the slider is supported to the stator to be relatively movable in various arrangement.

A linear motor disclosed in Patent Document 1 (Japanese Patent Application Laid-open Publication No. H09-261943) includes a stator to which a rail is mounted, and a slider is slid along the rail to thereby realize the relative movement of the slider to the stator.

Furthermore, the stator is provided with an armature coil and a drive control circuit for supplying driving current to the armature coil, and the slider is mounted with a field magnet. By supplying the driving current to the armature coil, a magnetic thrust force is generated between the stator and the slider so as to slidably move the slider relatively to the stator.

Moreover, in a conventional linear motor, although the motion of the slider is guided by the rail mounted to the stator, the rail also has a function for retaining a gap in the direction of the magnetic power caused by the supplying of the driving current to the armature coil. In an arrangement in which any gap does not exist between the stator and the slider in the linear motor, the stator and the slider are stuck together by the magnetic force generated by supplying the driving current to the armature coil, which may adversely result in impossibility of the relative motion of the slider to the stator, and accordingly, it is necessary to control or manage the gap between the stator and the slider of the linear motor.

Figure 13:
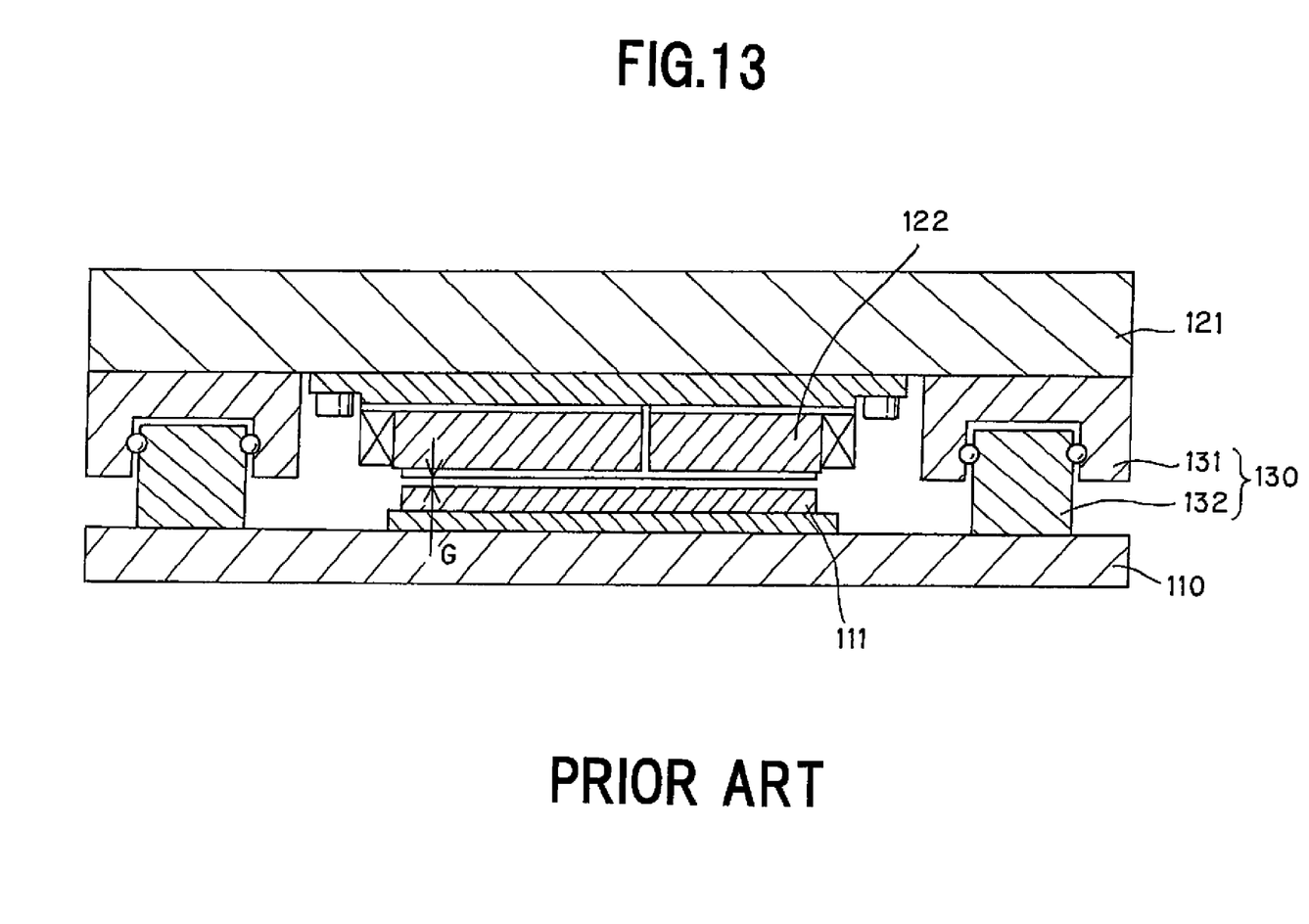
FIG. 13 is a cross sectional view of a conventional linear motor corresponding to FIG. 2 of the first embodiment.

Furthermore, a conventional structure for controlling the gap between the stator and the slider includes, other than the structure controlled by the installation of the rail as mentioned above in the Patent Document 1, in which there is known a linear motor, as shown in FIG. 13, in which a gap G is controlled by the location of a motion guide device 130 including movable member 131 mounted to a slider 121 and a track rail 132 mounted to a stator 110.

Patent Document 2 (Japanese Utility Model Application Laid-open Publication No. S58-186788) further provides a structure for controlling a gap between the stator and the slider, in which either one of the stator or slider is formed with a solid lubrication film so as to form a gap.

However, the structures of the linear motors of the prior art such as mentioned above require guide units or members such as rails extending along the moving direction of the slider, which does not contribute to the reduction of manufacturing cost, thus being disadvantageous.

Furthermore, in the conventional structure, it is necessary to construct the guide unit to the stator so as to continuously extend along the moving direction of the slider, and therefore, it is impossible to adopt a structure in which stators are arranged in plural rows non-continuously with a distance therebetween along the moving direction of the slider, thus also being disadvantageous.

Still furthermore, in the structure in which the solid lubrication film is formed, in order to form the film with a thickness corresponding to necessary gap, it is necessary to grind the solid lubrication film to provide a required thickness after the application of the solid lubrication film. This involves a troublesome working to precisely control the gap.

SUMMARY OF THE INVENTION

The present invention was conceived in consideration of the circumstances encountered in the prior art mentioned above, and an object thereof is to provide a linear motor having a compact and simple structure capable of easily controlling a gap between an armature coil and a magnet of the linear motor even in a case where a plurality of stators are arranged in plural rows in non-continuous manner.

The above and other objects can be achieved according to the present invention by providing a linear motor comprising: a stator; a slider disposed to be movable relatively with respect to the stator with a gap; and a non-magnetic plate mounted to either one of the stator and the slider so as to define the gap between the stator and the slider.

The present invention of the aspect mentioned above may provide following preferred embodiments.

The non-magnetic plate may be disposed so as to extend in a moving direction of the slider.

The non-magnetic plate may abut against another one of the stator and slider to be slidable.

Wheels may be attached to both side edge portions in a width direction of another one of the stator and slider, and the non-magnetic plate abuts against another one thereof to be rotatable. It may be desired that the non-magnetic plate is formed with rolling grooves in a direction along which the slider is moved so that the wheels roll on the rolling grooves.

The stator may be provided with a support member supporting the slider in a gravity direction.

It may be desired that a plurality of stators are arranged in a plurality of rows in a direction along which the slider moves through a gap from each other.

Furthermore, it may be preferred that the stator is composed of a bottom plate, side plates standing upward from both side edge surfaces of the bottom plate and an armature coil attached to a surface of the bottom plate facing the non-magnetic plate, and the slider is composed of a sliding member and a magnet mounted to the sliding member so that the non-magnetic member abuts against the slider to be slidable in such a manner as to control a gap between the armature coil and the magnet.

According to the present invention of the characters and structures mentioned above, the gap between the stator and the slider can be controlled or adjusted by the non-magnetic plate mounted to either one of the stator and the slider in an easy manner with a simple structure in comparison with a conventional structure, thus being advantageous in workability and manufacturing cost.

The nature and further characteristic features of the present invention will be made clearer from the following descriptions made with reference to the accompanying drawings.

DESCRIPTION OF THE PREFERRED EMBODIMENTS

Hereunder, preferred embodiments of linear motors of the present invention will be described with reference to the accompanying drawings, which however do not define the inventions of the appended claims. Furthermore, it is to be noted that terms "upper", "lower", "right", "left" and the like terms are used herein with reference to the illustrations of the drawings or an actual arrangement in product thereof.

First Embodiment

The first embodiment will be described hereunder with reference to FIGS. 1 to 5.

Figure 1:
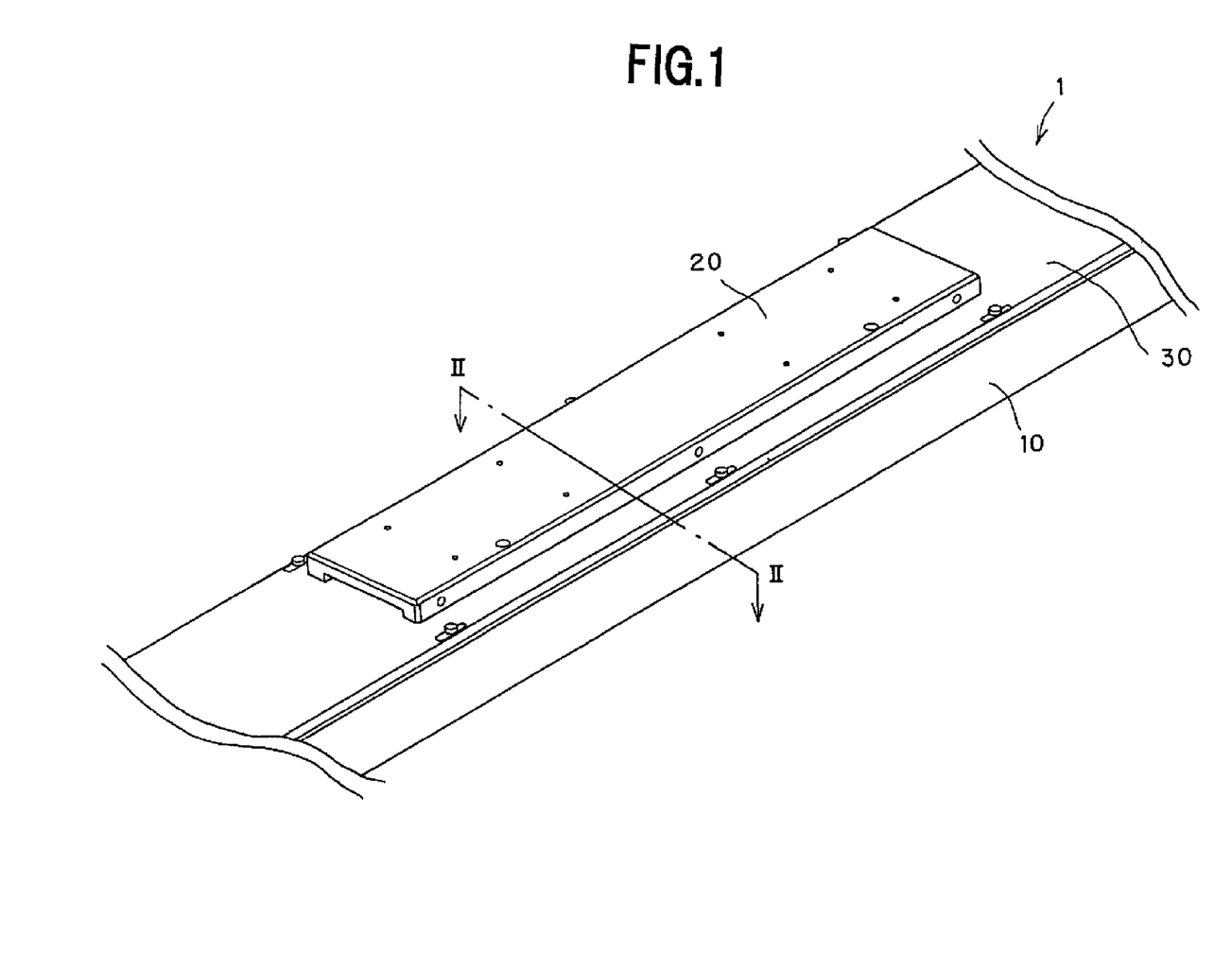
FIG. 1 is a perspective view showing a linear motor according to a first embodiment of the present invention.

As shown in FIG. 1, a linear motor 1 of this first embodiment comprises a stator 10 extending in a longitudinal direction of the linear motor 1, a non-magnetic plate 30 mounted to the stator 10 along its longitudinal direction, and a slider 20 disposed on the non-magnetic plate 30 to be slidably thereon.

Figure 2:
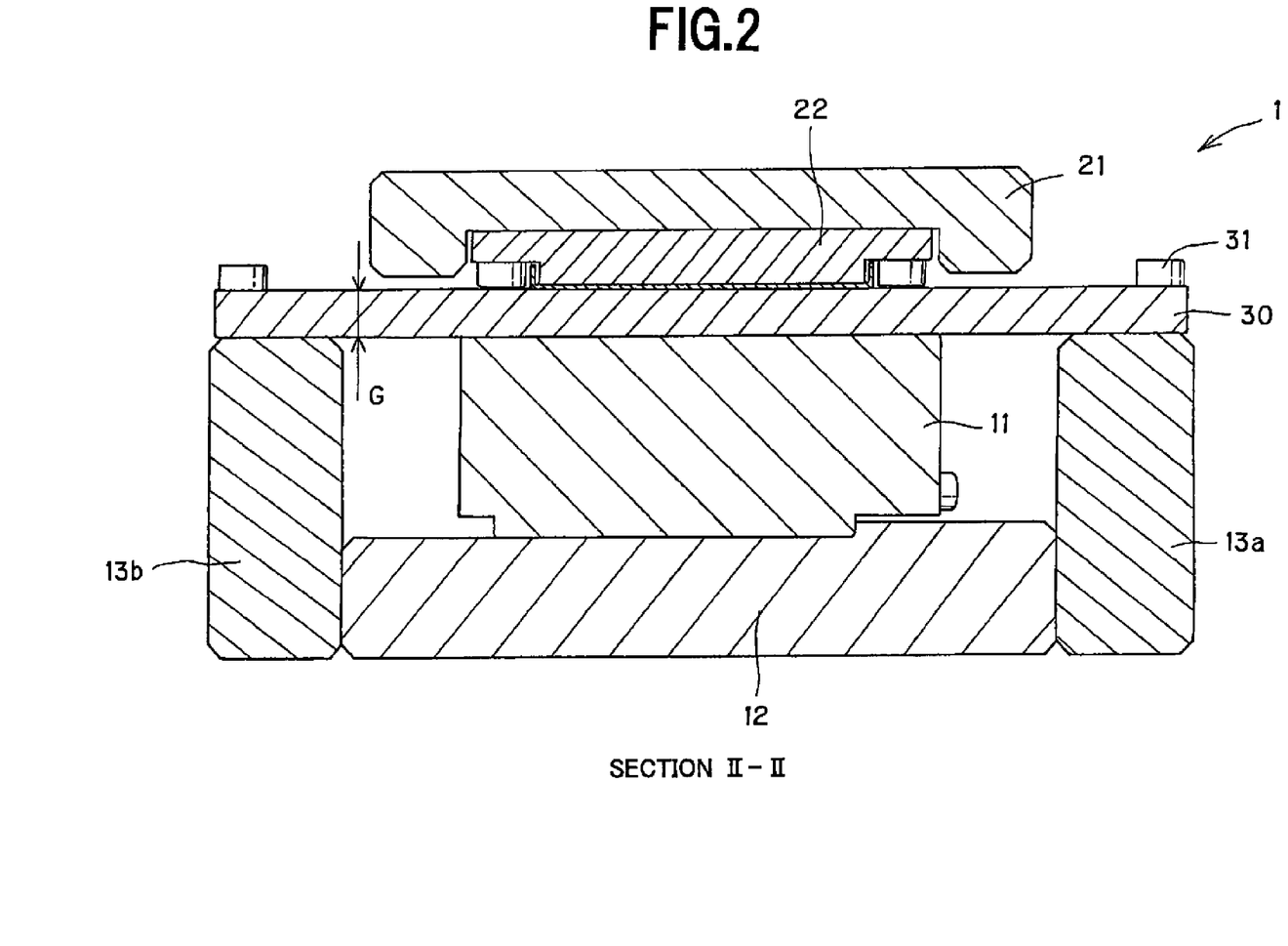
FIG. 2 is a cross sectional view of the linear motor shown in FIG. 1 taken along the line II-II in FIG. 1 for explaining construction thereof.

As shown in FIGS. 1 and 2, the stator 10 is composed of a bottom plate 12 extending along the longitudinal direction thereof, side plates 13a, 13b attached to both end faces of the bottle plate 12 in the width direction thereof so as to stand upward, and armature coil 11 fixed to the upper surface of the bottom plate 12.

The slider 20 is provided with a movable member 21 to a lower surface of which a magnet 22 is mounted. The non-magnetic plate 30 is attached to the upper surfaces of the side plates 13a, 13b of the stator 10 by means of bolts 31, 31. The slider 20 slidably abuts against the upper surface of the non-magnetic plate 30 to be relatively movable.

The non-magnetic plate 30 is mounted so that the lower surface thereof abuts against the upper surface of the armature coil 11 fixed to the stator 10.

As mentioned above, since the armature coil 11 and the non-magnetic plate 30 are mounted in the abutment manner, a gap G can only be prescribed or defined by the thickness of the non-magnetic plate 30, thereby easily adjusting the gap G.

Further, the slider 20 is constructed to be relatively movable with respect to the stator 10 by magnetic thrusting force generated between the armature coil 11 and the magnet 22 by supplying driving current to the armature coil 11 fixed to the stator 10. The gap G between the armature coil 11 and the magnet 22 is controlled by the location of the non-magnetic plate 30, and hence, by appropriately changing the thickness of the non-magnetic plate 30, the gap G can be easily adjusted.

Further, it is preferred that the non-magnetic plate 30 is formed of non-magnetic material such as austenite group stainless steal, ceramic, resin or like, and in consideration of generation of eddy current caused by moving the slider 20 at high speed, it is preferred that the non-magnetic plate 30 is formed of an insulating material.

Next, the respective parts or components constituting the linear motor 1 will be described hereunder.

Figure 3:
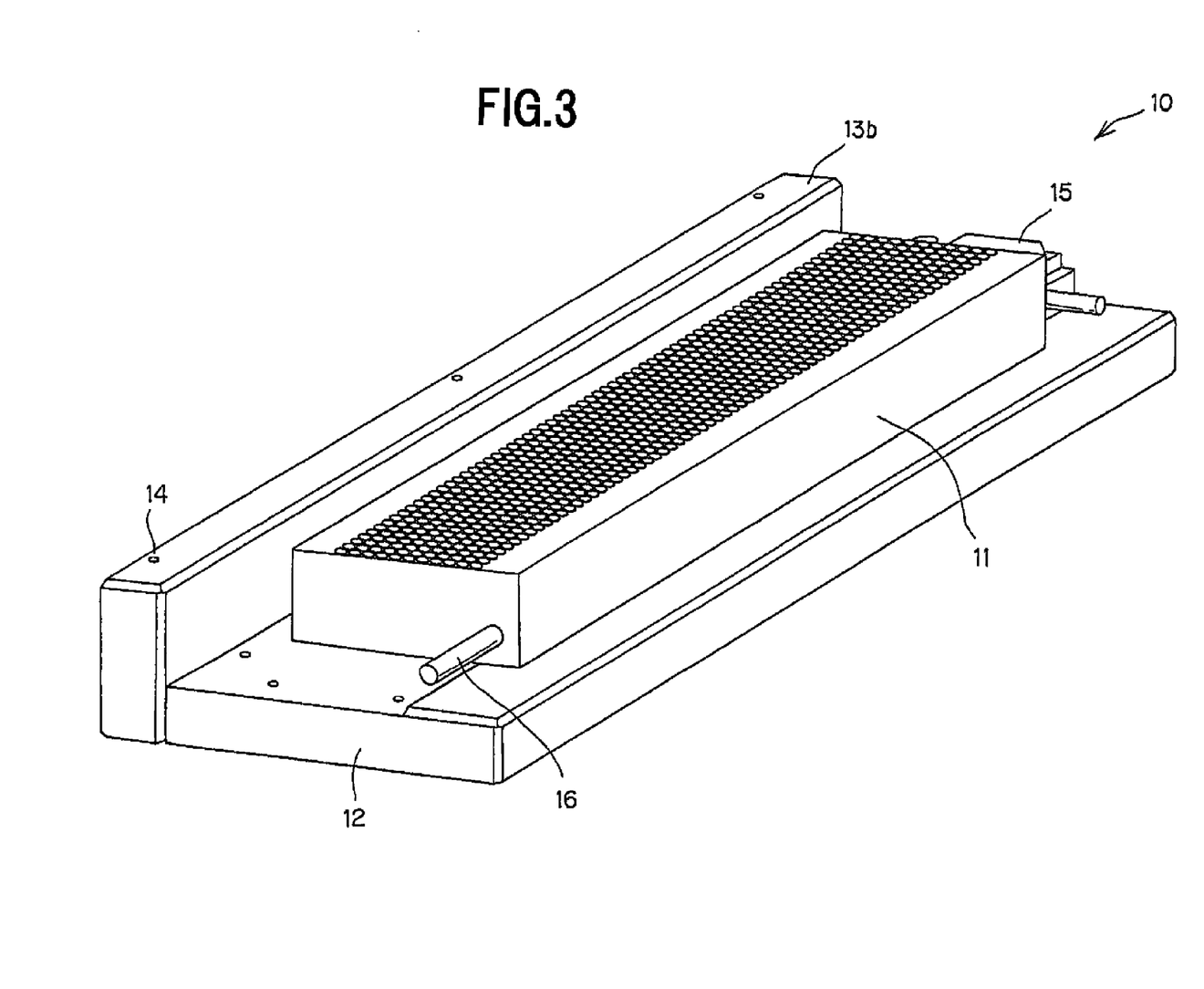
FIG. 3 is a partially developed perspective view showing a stator of the liner motor of the first embodiment of FIG. 1.

As shown in FIG. 3, the armature coil 11 is composed of a coil magnetically operative with the magnet 22 fixed to the slider 20 to which three-phase A.C. (alternative current) is supplied through the drive control circuit 15, and a salient-pole around which the coil is wound up, and this armature coil 11 is fixed to the bottom plate 12 of the stator 10. The coil constituting the armature coil 11 may include three types of coils of a U-phase coil, a V-phase coil and a W-phase coil. The salient-pole may also include three types of poles of a U-phase salient-pole, a V-phase salient-pole and a W-phase salient-pole. These are examples caused on the slider side by passing current through the coils, and these coils and salient-poles constitute periodical structure in which the U-phase, the V-phase and the W-phase are arranged periodically in the described order in the direction of the relative motion of the stator 10 and the slider 20. That is, the coil and salient-pole in the longitudinal direction of the stator 10, one example of the relative motion direction, constitutes the periodical structure of the U-phase, the V-phase and the W-phase. Further, a core portion of an electromagnet of the stator including the salient-pole is formed of a magnetic material having less magnetic hysteresis loss such as silicon steel.

Furthermore, a plurality of armature coils 11 are arranged along the longitudinal direction of the stator 10, and the respective armature coils 11 are electrically coupled through electric supply lines 16.

The side plates 13a, 13b (13a is not shown in FIG. 3) are formed with upper surfaces in which a plurality of mount holes 14 are punched, and the bolts 31 are fastened to these mount holes 14 to be capable of attaching the non-magnetic plate 30 to the stator 10.

Figure 4:
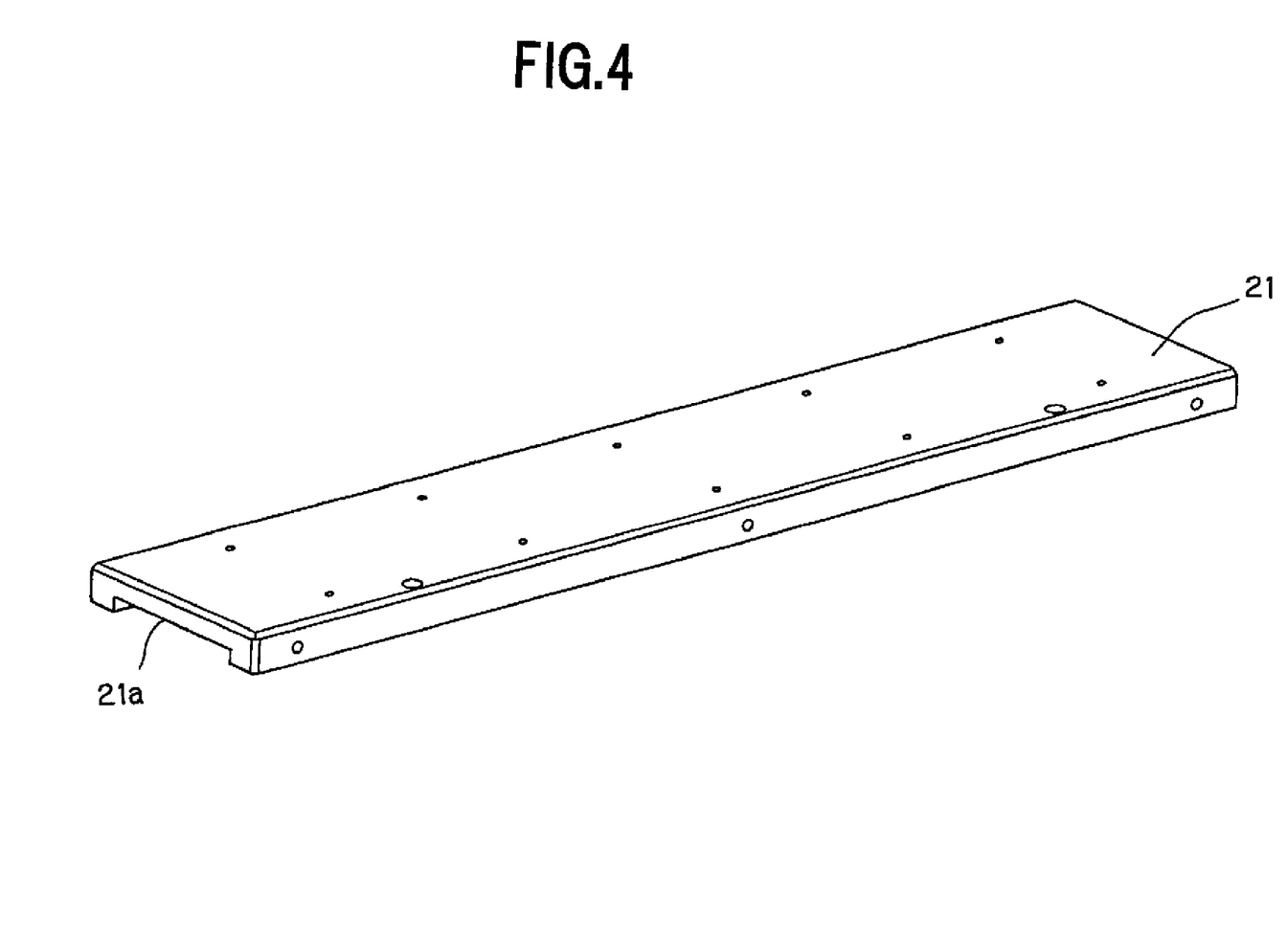
FIG. 4 is a perspective view of a slider of the linear motor of the first embodiment.
Figure 5:
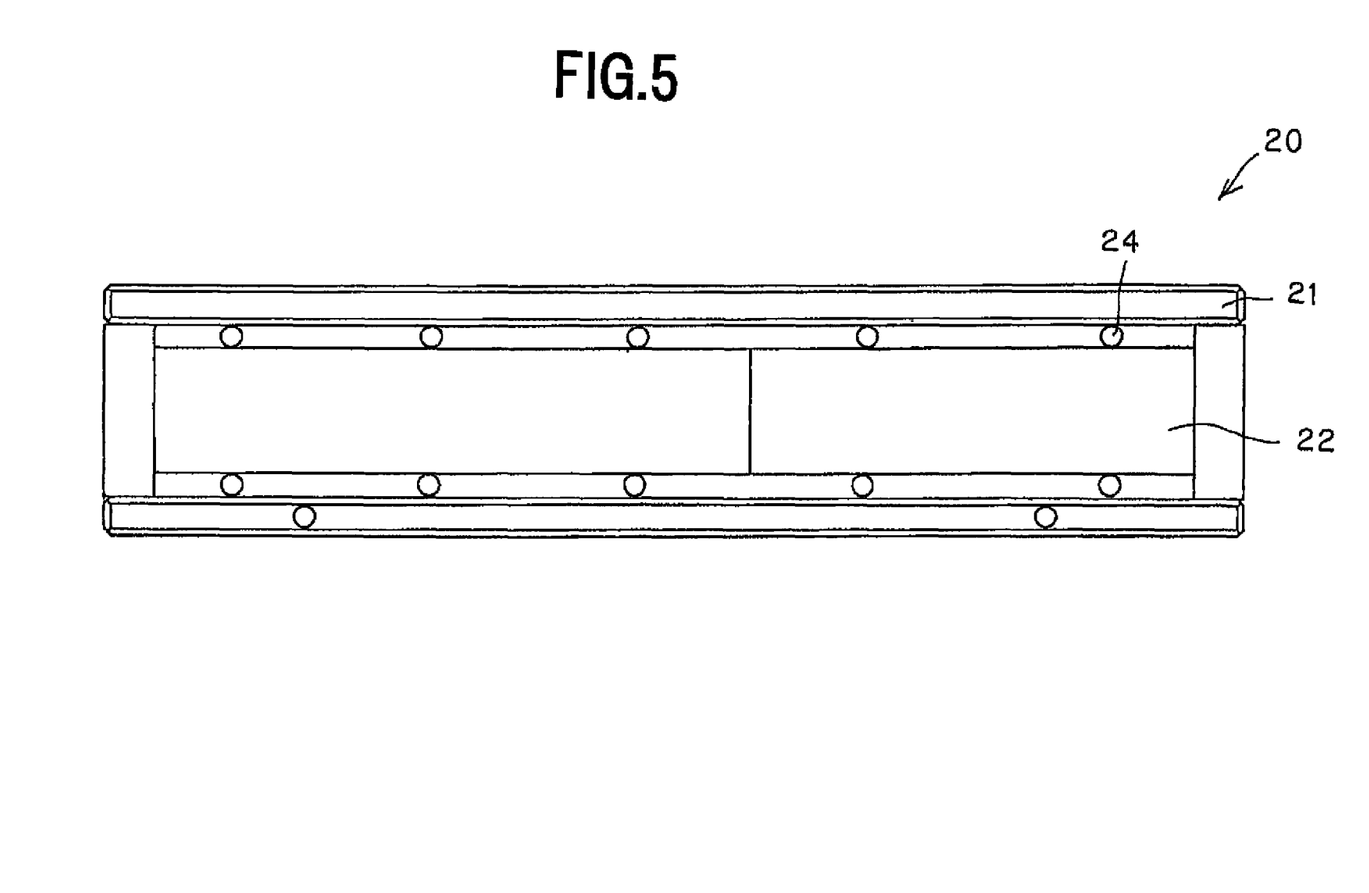
FIG. 5 is a bottom view of the slider of the linear motor of the first embodiment.
Figure 6:
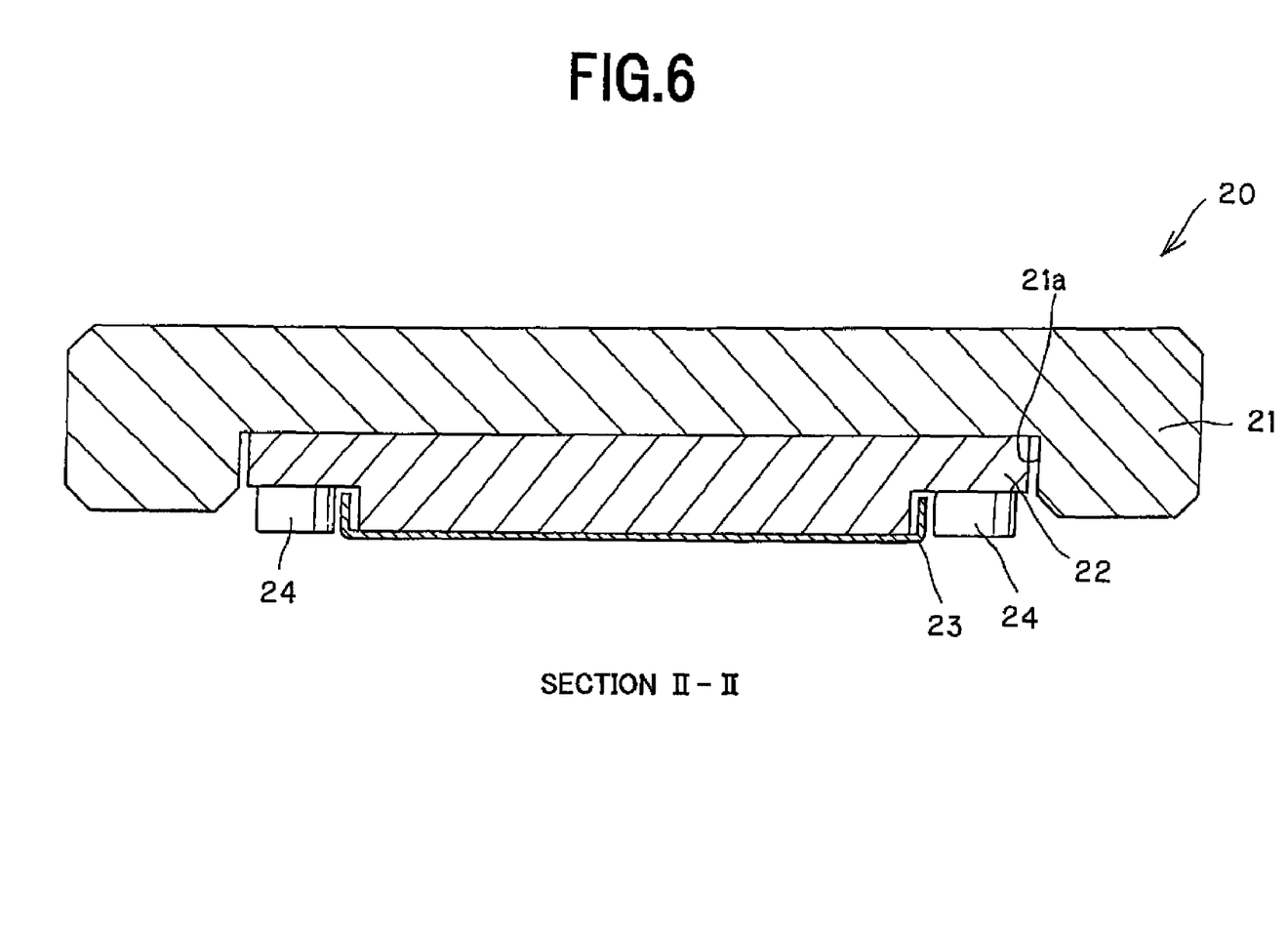
FIG. 6 is a cross sectional view of the slider of the linear motor of the first embodiment taken along the line II-II in FIG. 1.

As shown in FIGS. 4 to 6, the slider 20 of the linear motor of this embodiment is provided with a movable member 21 formed with a recessed portion 21a extending along the longitudinal direction thereof, a magnet 22 and a slidable plate 23 mounted to a surface of the magnet 22 opposing to the non-magnetic plate 30.

As shown in FIG. 5, the magnet 22 is arranged along the longitudinal direction of the movable member 21, and the magnet 22 may be composed of single or a plurality of magnets 22 (unit of magnets).

The slidable plate 23 attached to the magnet 22 is mounted so as to achieve smooth sliding motion between the magnet 22 and the non-magnetic plate 30, and for this purpose, surface treatment such as metal film treatment, non-metal film treatment, or burnishing treatment may be performed so as to reduce sliding resistance. Further, in a case where such surface treatment is made directly to the sliding surface between the magnet 22 and the non-magnet plate 30 to reduce the sliding resistance, the location of the sliding plate 23 may be eliminated.

Furthermore, it may be possible to introduce compressed air between the surfaces of the magnet 22 and the non-magnetic plate 30 opposing to each other so as to float upward the magnet 22 with a small space with respect to the non-magnetic plate 30. According to such floating of the magnet by using the compressed air, the sliding resistance can be substantially eliminated.

In the linear motor 1 of this embodiment, the magnetic force attracting the armature coil 11 and the magnet 22 from each other is generated as suction force, the slider 20 is only rested on the flat-shaped non-magnetic plate 30 to be slidable, and the motion of the non-magnetic plate 30 in the width direction is restricted by the attraction force.

As mentioned above, according to the linear motor 1 of the described first embodiment of the present invention, the gap G between the armature coil 11 and the magnet 22 is controlled and regulated by the slidable abutment of the magnet 22 against the non-magnetic plate 30 attached to the stator 10, so that the gap G can be controlled by the very easy manner and simple structure, thus improving cost performance.

Furthermore, in this first embodiment, in the linear motor 1, the slider 20 is arranged to be slidable with respect to the non-magnetic plate 30 by the action of the magnetic force caused between the armature coil 11 and the magnet 22 without intervening any means such as motion guide device, so that the present invention may be applied to a non-continuous type stator unit in which a plurality of stators are arranged with gaps, respectively.

Second Embodiment

As mentioned above, the linear motor 1 in the first embodiment was explained in the case where the magnet 22 is directly slid on the non-magnetic plate 30. In this second embodiment, a motion mode of a slider 20 of a linear motor 2 having different structure from that of the first embodiment will be explained. Further, like reference numerals are added to parts or components corresponding to those of the first embodiment, and duplicated explanation will be omitted herein.

Figure 7:
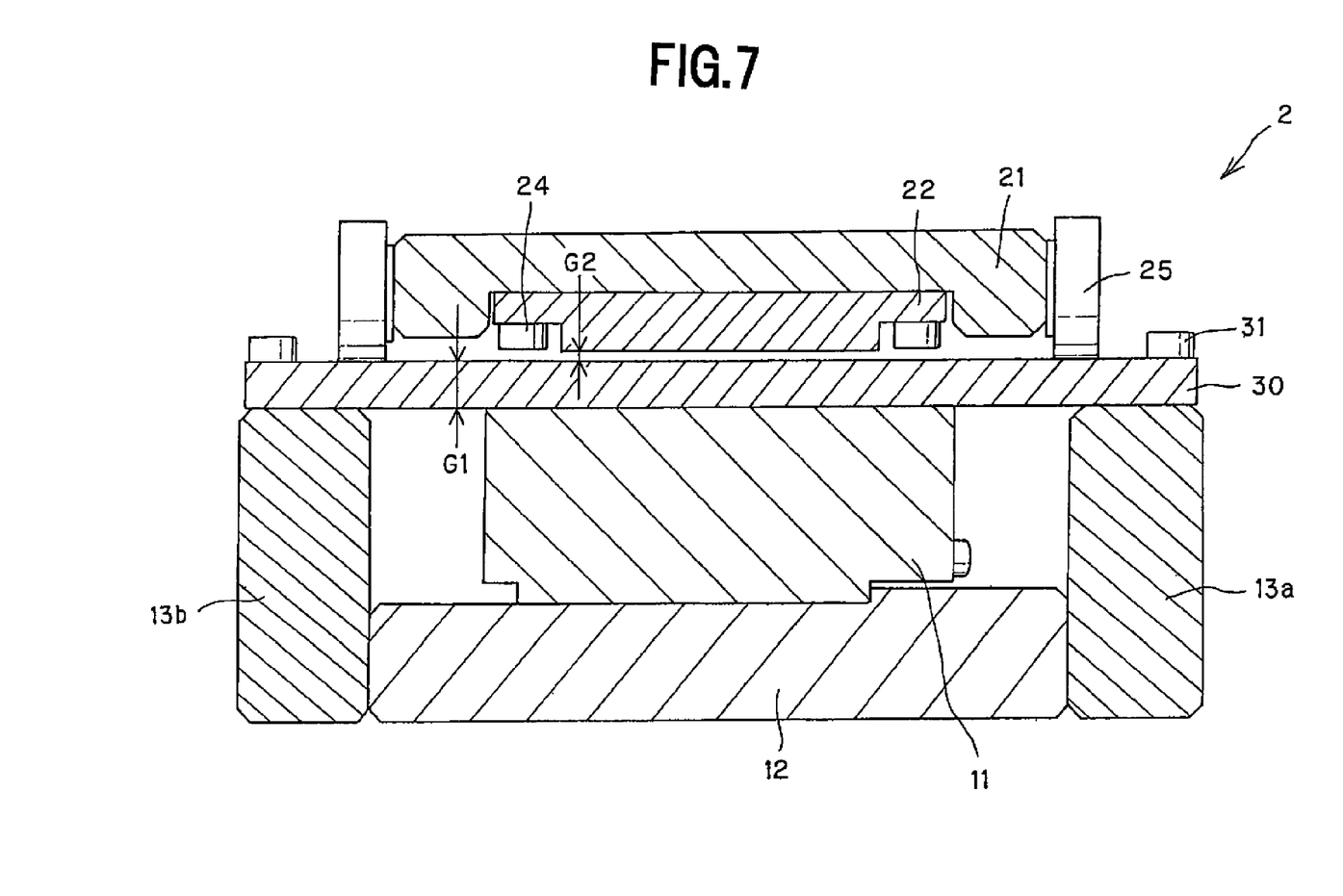
FIG. 7 is a cross sectional view of a linear motor according to a second embodiment of the present invention corresponding to FIG. 2 of the first embodiment.
Figure 8:
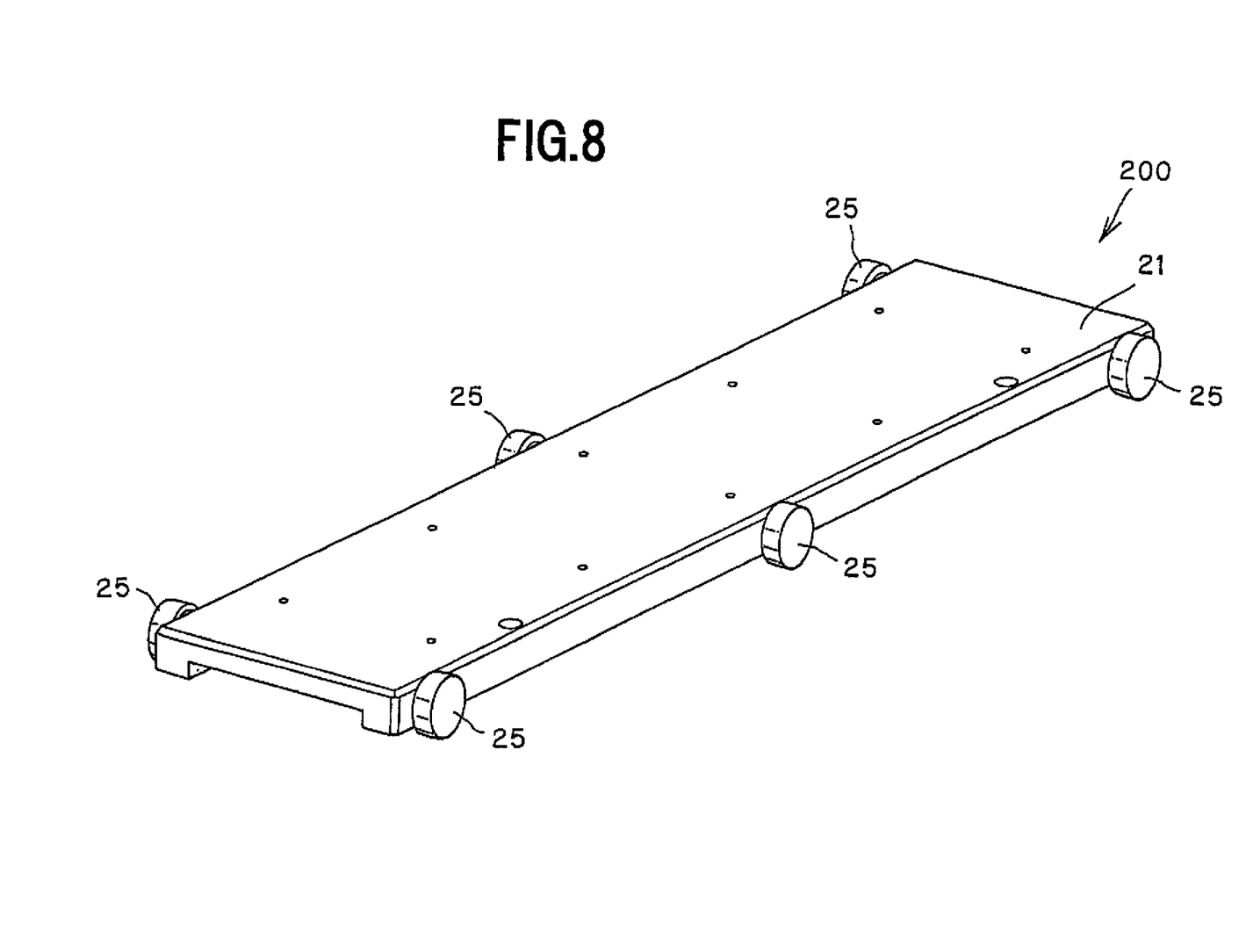
FIG. 8 is a perspective view of a slider of the linear motor of the second embodiment of FIG. 7.

FIG. 7 is a cross sectional view of the linear motor 2 according to the second embodiment of the present invention, and FIG. 8 is a perspective view of the slider of this linear motor 2.

As shown in FIG. 7, the linear motor 2 of this second embodiment differs from that of the first embodiment in the structure of the slider 20 (slider 200 in this second embodiment) which is provided with wheels 25.

As shown in FIG. 8, the slider 200 of the linear motor 2 are provided with the wheels 25, to be rotatable, to both side edges of the movable member 21 in the width direction thereof and the central portion in the longitudinal direction thereof (totally six wheels 25). In such a case where the wheels 25 are provided for the central portion of the movable member 21 in the longitudinal direction, even in a case when the slider 200 moves on the non-continuous stators 10 and the non-magnetic plates 30 (in which a plurality of stator 10 and non-magnetic plates 30 are arranged with a gap), when the wheels 25 pass forward in the advancing direction in the gap formed between the adjacent non-magnetic plates 30, the attitude of the slider 200 can be maintained by the central wheels 25 and rear-side wheels 25 in the advancing direction, without a fear such that the forward wheels 25 fall down into the gap between the adjacent non-magnetic plates 30. Accordingly, the motion of the slider 200 cannot be obstructed, and hence, the wheels 25 can move on the non-continuous non-magnetic plates 30.

Furthermore, the linear motor 2 of this second embodiment is constructed such that a gap between the armature coil 11 and the magnet 22 is a sum of the thickness G1 of the non-magnetic plate 30 and the gap G2 between the upper surface of the non-magnetic plate 30 and the magnet 22. It will be further desirable to make the gap G2 as possible as small, and it is hence preferred to properly adjust the outer shape of the wheels 25 and make substantially eliminate the gap between the upper surface of the non-magnetic plate 30 and the lower surface of the magnet 22.

The number of the wheels 25 may be changed appropriately in accordance with the non-continuous arrangement of the non-magnetic plates 30. In a case where the non-magnetic plates 30 are continuously arranged in the longitudinal direction, the wheels 25 may be attached only to four corner portions of the slider 200.

Further, the wheels 25 may be formed of any substance or material as far as the wheels 25 can smoothly roll and move the non-magnetic plates 30, and for example, stainless steel or rubber material may be preferably utilized.

Third Embodiment

As mentioned above, the linear motors 1 and 2 in the first and second embodiments were explained in the cases where the slider 20 restrict the motion of the non-magnetic plate(s) 30 in the width direction by the action of the magnetic force generated between the magnet 22 and the armature coil 11.

A linear motor of the third embodiment performs a guide motion of the slider 20 having a mode different from those in the first and second embodiments. Further, like reference numerals are added to parts or components corresponding to those of the first embodiment, and duplicated explanation will be omitted herein.

Figure 9:
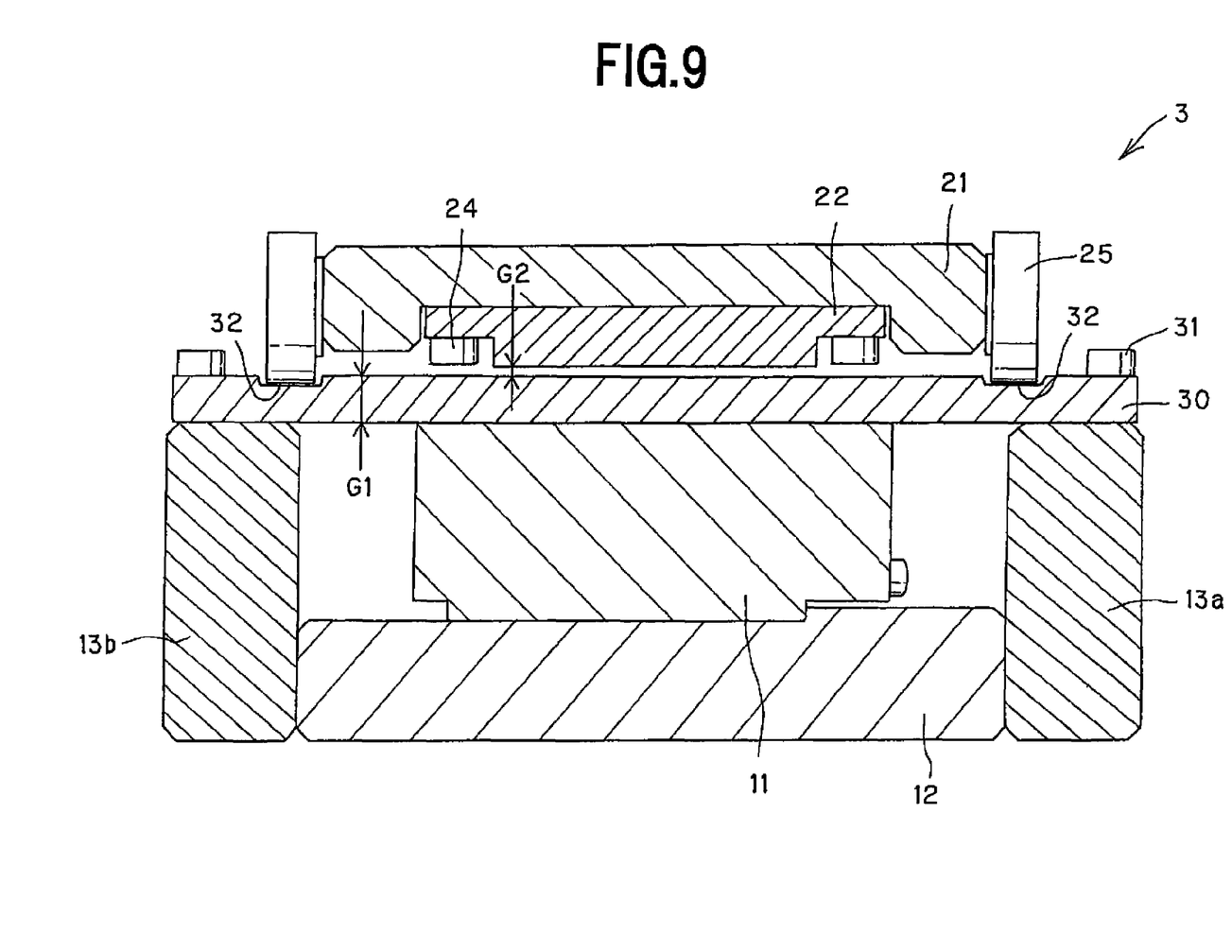
FIG. 9 is a cross sectional view of a linear motor according to a third embodiment of the present invention for explaining construction thereof corresponding to FIG. 2 of the first embodiment.

FIG. 9 is a sectional view illustrating structure of the linear motor according to the third embodiment, and as shown in FIG. 9, the linear motor 3 of this third embodiment differs from the second embodiment in that the non-magnetic plate 30 is formed with wheel rolling grooves 32 on which the wheels 25 can roll along the longitudinal direction of the non-magnetic plate 30.

As mentioned above, in this third embodiment, the non-magnetic plate 30 of the linear motor 3 is provided with the rolling grooves 32 along which the wheels 25 roll, the slider 20 can smoothly move along the rolling grooves 32 by the engagement of the wheels 25 with the rolling grooves 32 in addition to the suction force due to the magnetic force generated between the armature coil 11 and the magnet 22. Further, according to this third embodiment, even in a case where a moving path of the slider is curved and the slider performs a curvilinear motion, the slider can be smoothly and stably guided.

Fourth Embodiment

In the first to third embodiments mentioned above, although the non-magnetic plate(s) 30 are secured to the stator 10 in the linear motors 1, 2 and 3, respectively, the fourth embodiment provides a linear motor in which the non-magnetic plates are mounted in a manner different from those in the linear motors of the first to third embodiments. Further, like reference numerals are added to parts or components corresponding to those of the first to third embodiments, and duplicated explanation will be omitted herein.

Figure 10:
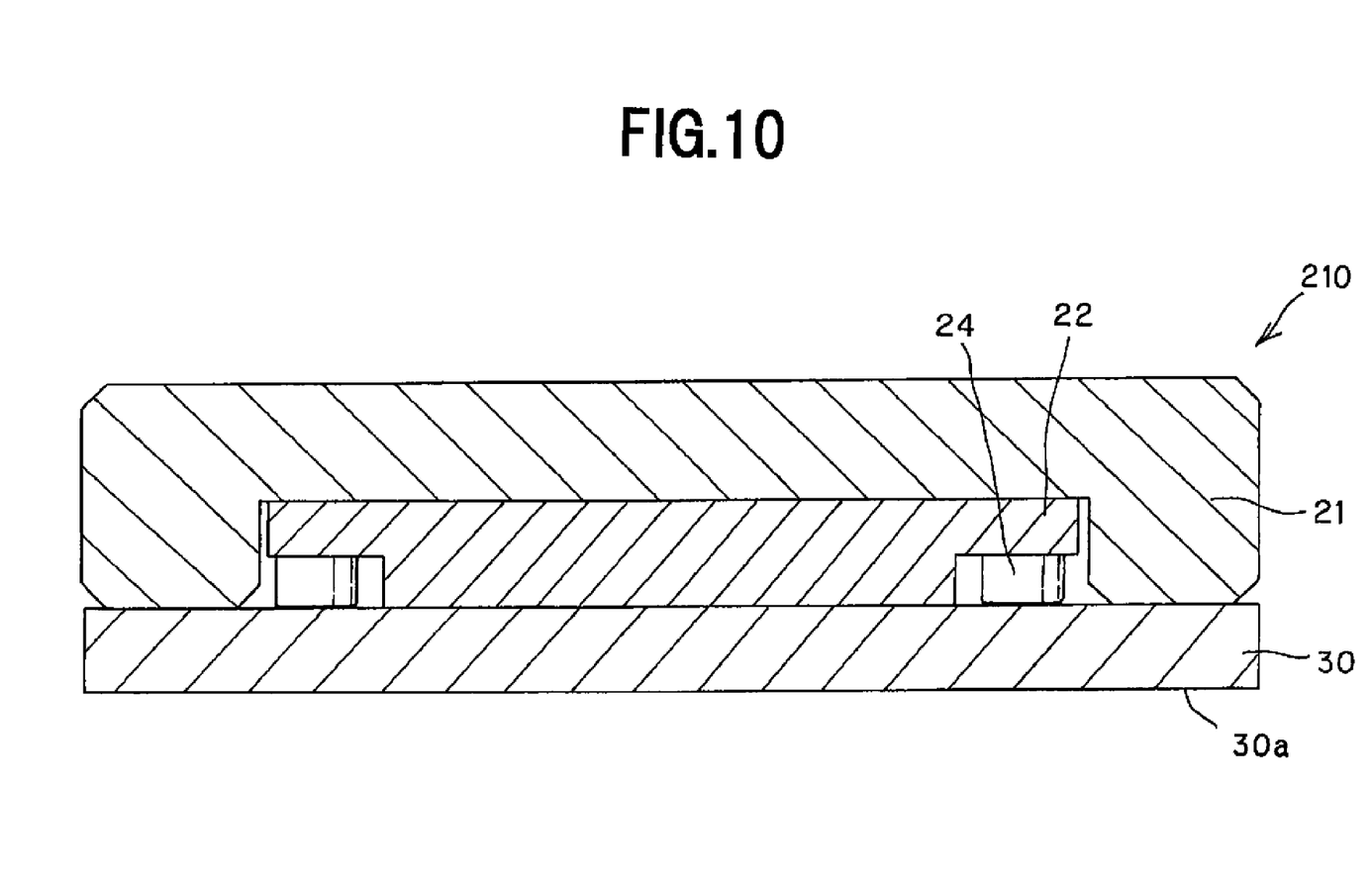
FIG. 10 is a cross sectional view of a slider of the linear motor of a fourth embodiment of the present invention for explaining construction thereof corresponding to FIG. 2 of the first embodiment.

FIG. 10 is a sectional view illustrating the structure of a slider of a linear motor according to the fourth embodiment of the present invention, and as shown in FIG. 10, a slider 210 of this embodiment is formed by mounting the non-magnetic plate 30 of the linear motor 1 of the first embodiment in a manner such that the lower surface of the magnet 22 abuts against the upper surface of the non-magnetic plate 30, so that the gap between the armature coil 11 and the magnet 22 is restricted and adjusted by the thickness of the non-magnetic plate 30 as in the linear motor 1 of the first embodiment.

In the slider 210 of this fourth embodiment, the non-magnetic plate 30 has a lower sliding surface 30a, which is directly slidable together with the stator 10. Further, the sliding surface 30a and the stator 10 may be slid relatively with each other by the sliding motion between the side plates 13a, 13b and the upper surface of the stator 10. Furthermore, the sliding surface 30a and the surface of the stator 10 along which the sliding surface 30a is slid may be subjected to the surface treatment such as made to the sliding plate 32, or the sliding resistance may be reduced by introducing the compressed air as made in the former embodiment.

As mentioned above, as in this fourth embodiment, by mounting the non-magnetic plate 30 to the slider 210 and relatively directly sliding the non-magnetic plate 30 and the stator 10, it is not necessary to construct the non-magnetic plate 30 so as to extend along the moving direction of the slider 210, thus easily mounting the non-magnetic plate 30.

Fifth Embodiment

In the linear motors of the first to fourth embodiments, the stator 10 is installed on a table or ground, and the slider is moved (slid) thereon. The linear motor in the fifth embodiment, however, is installed in a manner or mode different from those of the first to fourth embodiments. Further, like reference numerals are added to parts or components corresponding to those of the first to third embodiments, and duplicated explanation will be omitted herein.

Figure 11:
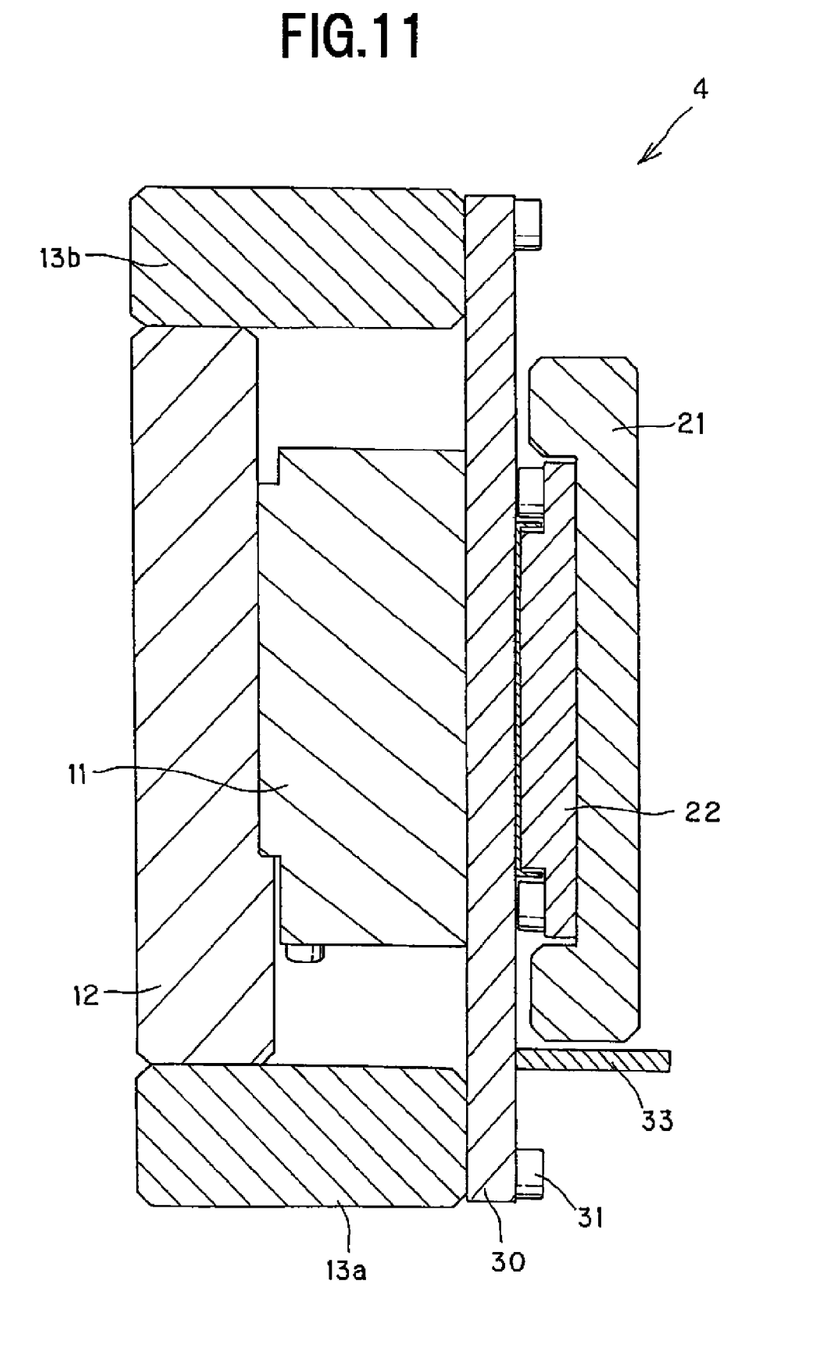
FIG. 11 is a cross sectional view of a linear motor of a fifth embodiment of the present invention for explaining construction thereof corresponding to FIG. 2 of the first embodiment.
Figure 12:
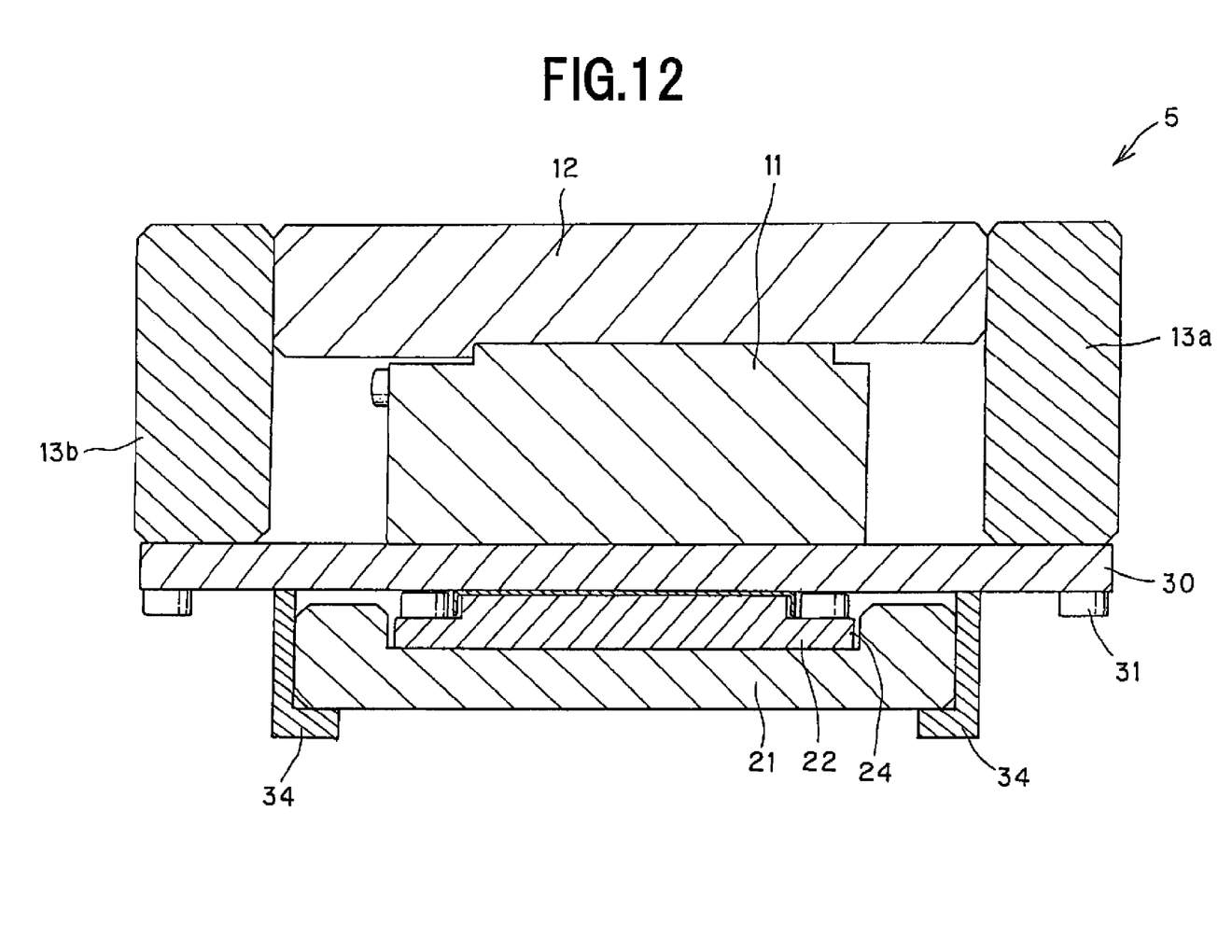
FIG. 12 is a cross sectional view of a modified structure of the linear motor of the fifth embodiment for explaining construction thereof corresponding to FIG. 2 of the first embodiment.

FIG. 11 is a cross sectional view of the linear motor of the fifth embodiment of the present invention for explaining construction thereof, and FIG. 12 is a cross sectional view of a modified structure of the linear motor of the fifth embodiment for explaining construction thereof.

As shown in FIG. 11, the linear motor 4 of this fifth embodiment has a bottom plate 12 which is attached to a wall, and in this structure, the linear motor of this embodiment differs from those of the other embodiments mentioned hereinbefore.

The linear motor 4 generates a suction force by the magnetic force between the magnet 22 and the armature coil 11 by supplying driving current to the armature coil as mentioned with reference to the first embodiment. Because of this reason, in the case where the linear motor 4 is attached to the wall, since the slider is attracted toward the stator side by the suction force, the self-gravity (own weight) of the slider can be held by the suction force.

This suction force can be controlled or adjusted by adjusting current value to be applied to the armature coil 11. However, in a case when the suction force is excessively increased, the sliding resistance of the slider is also increased, so that it is necessary to adjust the suction force by properly controlling the current to be supplied. Further, in a case where the supply current is controlled so as to decrease the suction force, a support plate 33 supporting a lower end of the slider may be attached to the slider along the longitudinal direction of the non-magnetic plate 30 so that the slider does not fall down by the own weight.

Furthermore, as shown in FIG. 12, the linear motor 5 of this embodiment may be mounted such that the bottom plate 12 thereof is mounted to a ceiling so that the slider is slidable downward from the stator. In such modified case, the own weight of the slider can be supported by the suction force between the armature coil 11 and the magnet 22.

Moreover, as mentioned above, in consideration of the case where the current to be supplied to the armature coil 11 is controlled, as shown in FIG. 12, a support plate 34 supporting the lower end of the slider can be attached to the slider along the longitudinal direction of the non-magnetic plate 30. According to such mounting of the support plate 34, the fall-down of the slider by the own weight due to change of the suction force between the armature coil 11 and the magnet 22 can be effectively prevented from causing.

As mentioned above, the linear motors 4 and 5 of this embodiment may easily take many installing types such as wall-mounting type, ceiling suspending type or the like type.

Furthermore, in the described first to fifth embodiments, the stators 10 are disposed continuously so as to extend along the longitudinal direction thereof, the direction or orientation of the stators is not limited to the described embodiments, and for example, the stators 10 may be arranged non-continuously in a plurality of rows with a space from each other.

Still furthermore, in the described embodiments of the linear motors, many mounting or arranging manners of the stators are provided and explained, the present invention is not limited to the described manners, and for example, the stators may be installed in an obliquely inclining manner with respect to the width direction thereof.

In the linear motor of the first embodiment, although the motion of the slider in the width direction is restricted by the suction force, it may be possible to dispose support plates in standing attitude so as to guide both sides of the slider. Further, a curved, not flat, non-magnetic plate may be also usable, and wall surfaces may be utilized therefor.

It is further to be noted that the present invention is not limited to the described embodiments, and other changes and modifications such as mentioned above may be made without departing from the scopes of the appended claims.

What is claimed is:

1. A linear motor comprising:
    a stator;
    a slider disposed to be movable relatively with respect to the stator with a gap; and
    a non-magnetic plate mounted to either facing surface of the stator and the slider between the stator and the slider, the gap between the stator and the slider defined by the thickness of the non-magnetic plate, and
    another one of the stator and the slider slidably arranged against an upper surface of the non-magnetic plate to be relatively movable.

2. The linear motor according to claim 1, wherein the non-magnetic plate is disposed so as to extend in a moving direction of the slider.

3. The linear motor according to claim 1, wherein the non-magnetic plate abuts against another one of the stator and slider to be slidable.

4. The linear motor according to claim 1, wherein wheels are attached to both side edge portions in a width direction of another one of the stator and slider, and the non-magnetic plate abuts against another one thereof to allow the wheels to be rotatable.

5. The linear motor according to claim 4, wherein the non-magnetic plate is formed with rolling grooves in a direction along which the slider is moved so that the wheels roll on the rolling grooves.

6. The linear motor according to claim 1, wherein the stator is provided with a support member supporting the slider in a gravity direction.

7. The linear motor according to claim 1, wherein a plurality of stators are arranged in a plurality of rows in a direction along which the slider moves through a gap from each other.

8. The linear motor according to claim 1, wherein the stator is composed of a bottom plate, side plates standing upward from both side edge surfaces of the bottom plate and an armature coil attached to a surface of the bottom plate facing the non-magnetic plate, and the slider is composed of a sliding member and a magnet mounted to the sliding member so that the non-magnetic member is slidable in such a manner as to control a gap between the armature coil and the magnet.

9. A linear motor comprising:
a stator (10) extending in a longitudinal direction;
a non-magnetic plate (30) secured to the stator (10) along the longitudinal direction; and
a slider (20) disposed on the non-magnetic plate (30) and slidably on the non-magnetic plate (30), the slider (20) comprising a movable member (21) and a magnet (22) mounted to a lower surface of the movable member (21), the slider (20) slidably abutting against an upper surface of the non-magnetic plate (30) and movable relative to the upper surface of the non-magnetic plate (30),
the stator (10) comprising a bottom plate (12) extending along the longitudinal direction, two side plates (13a, 13b) attached to opposite end faces of the bottom plate (12) in the width direction thereof and standing upward, upper ends of the two side plates joined to the non-magnetic plate (30); and
an armature coil (11) fixed to an upper surface of the bottom plate (12), a lower surface of the non-magnetic plate (30) mounted in abutment against an upper surface of the armature coil (11),
wherein a thickness of the non-magnetic plate (30) defines a gap G between the lower surface of the magnet (22) and the upper surface of the armature coil (11), and the slider (20) is movable with respect to the stator (10) by magnetic thrusting force generated between the armature coil (11) and the magnet (22) by supplying a driving current to the armature coil (11).

10. The linear motor of claim 9, wherein,
the armature coil (11) is a three-phase alternating current (A.C.) coil arranged along the longitudinal direction, and
the slider (20) comprises a recessed portion (21a) extending along the longitudinal direction, the magnet (22) located in the recess, and a slidable plate (23) mounted to a lower surface of the magnet (22) opposing to the non-magnetic plate (30).

11. The linear motor of claim 9, further comprising:
wheels attached to both opposite side edge portions of the movable member (21), the wheels rotatable on the upper surface of the non-magnetic plate (30).

12. The linear motor according to claim 11, wherein,
the non-magnetic plate is formed with rolling grooves in the longitudinal direction, and
the wheels rest in the grooves and are rotatable along the rolling grooves so that the slider is moved with the wheels rolling on the rolling grooves.

13. A linear motor, comprising:
a stator (10);
an armature coil (11);
a slider (210) having a recess;
a magnet (22) located within the recess; and
a non-magnetic plate (30) mounted to the slider (210), a lower surface of the magnet (22) abutting against an upper surface of the non-magnetic plate (30), a gap between the armature coil (11) and the magnet (22) being restricted and adjusted by a thickness of the non-magnetic plate (30),
the non-magnetic plate (30) having a lower sliding surface (30a), the non-magnetic plate (30) being directly slidable together with the stator (10).

14. The linear motor of claim 13, wherein,
the stator (10) comprises side plates (13a, 13b),
the armature coil (11) is located between the side plates (13a, 13b),
the sliding surface (30a) and the stator (10) are slidable relatively with each other by a sliding motion between the side plates (13a, 13b) and an upper surface of the stator (10).

* * * * *